A. F. CONNER & G. L. WILLETT.
SIGN.
APPLICATION FILED APR. 16, 1914.
1,151,343.
Patented Aug. 24, 1915.
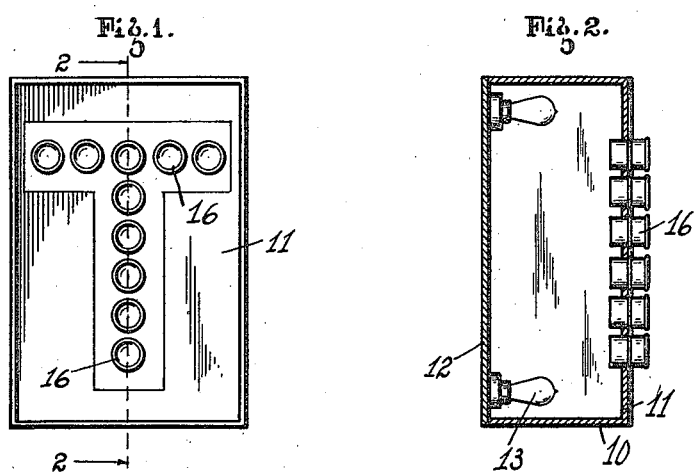
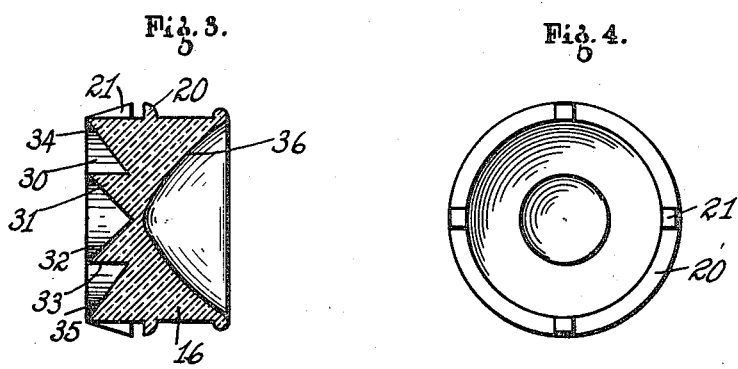
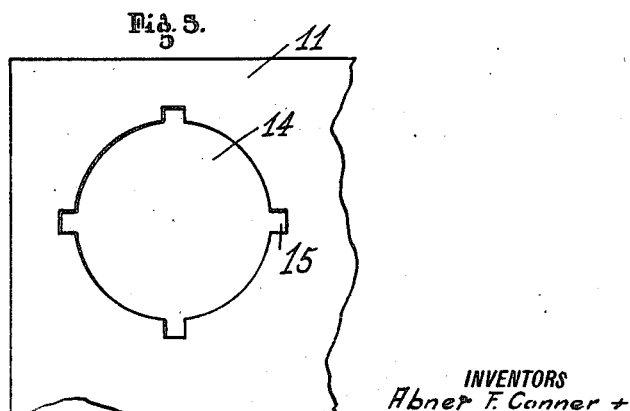
WITNESSES:
INVENTORS
Abner F. Conner +
Guy L. Willett
BY
ATTORNEY

UNITED STATES PATENT OFFICE.

ABNER F. CONNER AND GUY L. WILLETT, OF INDIANAPOLIS, INDIANA, ASSIGNORS TO THOS. CUSACK CO., A CORPORATION OF NEW JERSEY.

SIGN.

1,151,343. Specification of Letters Patent. Patented Aug. 24, 1915.

Application filed April 16, 1914. Serial No. 832,295.

*To all whom it may concern:*

Be it known that we, ABNER F. CONNER and GUY L. WILLETT, citizens of the United States, and residents of Indianapolis, county of Marion, and State of Indiana, have invented a certain new and useful Sign; and we do hereby declare that the following is a full, clear, and exact description thereof, reference being had to the accompanying drawings, in which like letters refer to like parts.

The object of this invention is to improve the refraction and distribution of light coming from the lamps or electric lights in the sign or advertising device.

The chief feature of the invention consists in placing in the holes of the front plate of such sign, lenses with prismatic and various surfaces, calculated to diffuse and distribute the light passing through the exterior of the sign. One purpose and advantage of the lenses is the illumination of the exterior surface of the sign or plate in which the lenses are mounted.

The nature of the invention will be understood from the accompanying drawings and the following description and claim.

In the drawings, Figure 1 is a front elevation of a sign showing one letter "T." Fig. 2 is a section on the line 2—2 of Fig. 1. Fig. 3 is a central section through one of the lenses. Fig. 4 is a front elevation of the lense. Fig. 5 is a front elevation of a portion of the front plate with the lense removed.

The sign consists of a box or chamber 10 having a front plate 11 and back plate 12. A number of electric lamps 13 are secured to the back plate.

The front plate is provided with a number of holes 14 substantially circular with recesses 15 at intervals surrounding said opening. In each of said openings 14 a lens 16 is inserted and held. It is not necessary that the holes 14 and lenses 16 be each directly in front of the lamp. The lenses and holes are arranged in such form as to indicate the letter or other sign, while lamps on the inside may be arranged in any fashion, and, in fact, any kind of light-producing means therein may be employed.

The lens is cylindrical with a rib 20 surrounding the same about midway, and at intervals around the inner portion of the lens there are inclined shoulders 21 spaced away from said ribs 20. Therefore, the lens can be pushed into the holes 14 and the shoulders 21 will register with the recesses 15. After the lens is pushed in to its limit, it is turned somewhat so the shoulders 21 will not register with the recesses 15, and in that manner the lens readily is held in position with the front plate.

The inner end of the lens has an annular recess 30 surrounding a central annular projection 31. The inner surface 32 of the projection 31 is conical, tapering inwardly to the center of the lens. The outer surface 33 of the projection 31 is cylindrical, and there is an annular projection 34 surrounding the recess 30 and having an inner inclined surface 35, its degree of inclination being less than that of the surface 32.

The outer end of the lens has in it a conical recess starting with an inclined surface 36 from the periphery of the lens and extending inward to the center of the lens.

The light within the chamber 10 is diffused and distributed in every direction by the surfaces 35, 33 and 32 on the inside and the surface 36 on the outside coacting with each other. This makes a soft and diffused glow or light and produces a very attractive and beautiful light sign.

By reason of the angular relation between the surfaces 36 of the lens and the external surface of the plate 11, a portion of the light will be reflected upon said latter surface so as to illuminate it. This gives a softened effect or glow to the sign which is very attractive and pleasing to the eyes. To enhance the effect, the surface of the plate 11 is painted or given any desired color.

The invention claimed is:

The combination with a light sign, of lenses through which the light shines, each of said lenses having on its inner side an annular projection near its periphery with an inwardly inclined annular surface thereon, a central annular projection with a cylindrical surrounding surface and an inwardly tapering inner surface, and the outside of the lens having an inwardly tapering surface, substantially as set forth.

In witness whereof, we have hereunto affixed our signatures in the presence of the witnesses herein named.

ABNER F. CONNER.
GUY L. WILLETT.

Witnesses:
J. H. WELLS,
O. M. McLAUGHLIN.